(12) United States Patent
Hu et al.

(10) Patent No.: US 10,802,788 B2
(45) Date of Patent: Oct. 13, 2020

(54) ELECTRONIC DEVICE, DISPLAY PANEL, AND DATA TRANSMISSION SYSTEM THEREOF

(71) Applicant: AU Optronics Corporation, Hsin-Chu (TW)

(72) Inventors: Chia-Hua Hu, Hsin-Chu (TW); Jen-Lang Tung, Hsin-Chu (TW); Chi-Hung Lu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 49 days.

(21) Appl. No.: 16/232,203

(22) Filed: Dec. 26, 2018

(65) Prior Publication Data
US 2020/0065043 A1 Feb. 27, 2020

(30) Foreign Application Priority Data

Aug. 21, 2018 (CN) .......................... 2018 1 0954584

(51) Int. Cl.
*G06F 3/147* (2006.01)
*G06K 19/07* (2006.01)
(Continued)

(52) U.S. Cl.
CPC ......... *G06F 3/147* (2013.01); *G06K 19/0715* (2013.01); *G09G 3/2092* (2013.01);
(Continued)

(58) Field of Classification Search
CPC .. G06F 3/147; G09G 3/2092; G09G 2310/08; H04B 5/0075; H04B 5/02;
(Continued)

(56) References Cited

U.S. PATENT DOCUMENTS 6,885,366 B1 *   4/2005 Tanaka ................. G09G 3/2011
                                                           345/100
8,188,933 B2 *   5/2012 Nakamura ............... H01Q 7/00
                                                           343/788

(Continued)

FOREIGN PATENT DOCUMENTS

CN         206040939         3/2017
CN         206461589         9/2017
CN         107561806         1/2018

*Primary Examiner* — Ariel A Balaoing
(74) *Attorney, Agent, or Firm* — WPAT, PC

(57) ABSTRACT

A display panel comprises a pixel array, multiple vertical driving lines, multiple parallel driving lines, and a first induction area. The pixel array comprises multiple pixels. One of the multiple parallel driving lines comprises a first driving line and a second driving line. The first induction area comprises part of the pixels, wherein magnetic field of a first RF antenna passes through the display panel via the first induction area, a first projection area is corresponding to a vertical projection of the first RF antenna on the display panel, and the first induction area is larger than the first projection area. The first driving line and the second driving line are configured to drive a first row of pixels among the part of the pixels, and the first driving line and the second driving line are electrically isolated from each other within the first induction area.

24 Claims, 11 Drawing Sheets

(51) Int. Cl.
*G09G 3/20* (2006.01)
*H01Q 1/22* (2006.01)
*H01Q 1/24* (2006.01)
*H01Q 1/52* (2006.01)
*H01Q 7/00* (2006.01)
*H04B 5/00* (2006.01)
*H04B 5/02* (2006.01)

(52) U.S. Cl.
CPC ........... *H01Q 1/2225* (2013.01); *H01Q 1/243* (2013.01); *H01Q 1/521* (2013.01); *H01Q 7/00* (2013.01); *H04B 5/0075* (2013.01); *H04B 5/02* (2013.01); *G09G 2310/08* (2013.01)

(58) Field of Classification Search
CPC ...... G06K 19/0715; H01Q 7/00; H01Q 1/521; H01Q 1/2225; H01Q 1/243
See application file for complete search history.

(56) References Cited

U.S. PATENT DOCUMENTS

2002/0084965 A1\* 7/2002 Park .................. G09G 3/3666
345/87
2009/0251404 A1\* 10/2009 Hwang ................ G09G 3/344
345/107
2014/0328084 A1\* 11/2014 Chuang .................. H01Q 7/00
362/623
2017/0179168 A1\* 6/2017 Suzuki ............. G02F 1/133553
2018/0220540 A1\* 8/2018 Suzuki ................ H05K 5/0017

\* cited by examiner

ELECTRONIC DEVICE, DISPLAY PANEL, AND DATA TRANSMISSION SYSTEM THEREOF

CROSS-REFERENCE TO RELATED APPLICATION

This application claims priority to China Application Serial Number 201810954584.4, filed Aug. 21, 2018, which is herein incorporated by reference in its entirety.

BACKGROUND

Field of Invention

The present disclosure relates to an electronic device. More particularly, the present disclosure relates to an electronic device having a display panel comprising multiple driving lines electrically isolated from each other.

Description of Related Art

Radio frequency identification (RFID) is widely used in various areas of the daily life, including the electronic payment, entrance control, and data exchange between electronic devices, etc. In some electronic devices, the radio frequency (RF) antenna supporting for many RFID applications is overlapped with the display panel. For example, the near field communication (NFC) antenna of a smartphone is commonly arranged behind the display panel to minimize the size of the smart phone.

In the situation that the RF antenna and the display panel are overlapped with each other, the magnetic field generated by the RF antenna will induce the induced current within the display panel. The induced current will flow on a loop path composed of the gate driving lines and the source driving lines of the display panel, and thus the induced current causes an induced magnetic field opposite to the magnetic field of the RF antenna. As a result, the induced magnetic field will offsets the radiated energy of the RF antenna, and thus the induced voltage generated at the recipient device of the RFID system is significantly decreased.

SUMMARY

The disclosure provides an electronic device comprising a display panel and a first RF antenna. The display panel comprises a pixel array, a first induction area, a plurality of vertical driving lines, and a plurality of parallel driving lines. The pixel array comprises a plurality of pixels. The first induction area is located on a surface of the display panel. A first projection area is corresponding to a vertical projection of the first RF antenna on the display panel, magnetic field generated by the first RF antenna passes through the display panel via the first induction area, and the first induction area is larger than the first projection area. One of the plurality of parallel driving lines overlaps with the first induction area, the one of the plurality of parallel driving lines comprises a first driving line and a second driving line, the first driving line and the second driving line are electrically isolated from each other, and the first driving line and the second driving line are configured to be enabled in synchronization with each other.

The disclosure provides a display panel comprising a pixel array, a plurality of vertical driving lines, a plurality of parallel driving lines, and a first induction area. The pixel array comprises a plurality of pixels. One of the plurality of parallel driving lines comprises a first driving line and a second driving line. The first induction area comprises part of the plurality of pixels, wherein magnetic field generated by a first RF antenna passes through the display panel via the first induction area, a first projection area is corresponding to a vertical projection of the first RF antenna on the display panel, and the first induction area is larger than the first projection area. The first driving line and the second driving line are configured to drive a first row of pixels among the part of the plurality of pixels, and the first driving line and the second driving line are electrically isolated from each other within the first induction area.

The disclosure provides a data transmission system comprising a first electronic device and a second electronic device. The first electronic device comprises a first display panel and a first RF antenna. The second electronic device comprises a second RF antenna, wherein when the first electronic device is approached to the second electronic device, the first electronic device transmits data to the second electronic device through the first RF antenna. The first display panel comprises a first pixel array, a plurality of first vertical driving lines, a plurality of first parallel driving lines, and a first induction area. The first pixel array comprises a plurality of first pixels. One of the plurality of first parallel driving lines comprises a first driving line and a second driving line. The first induction area comprises part of the plurality of first pixels, wherein magnetic field generated by the first RF antenna passes through the first display panel via the first induction area, a first projection area is corresponding to a vertical projection of the first RF antenna on the first display panel, and the first induction area is larger than the first projection area. The first driving line and the second driving line are configured to drive a first row of pixels among the part of the plurality of first pixels, and the first driving line and the second driving line are electrically isolated from each other within the first induction area.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
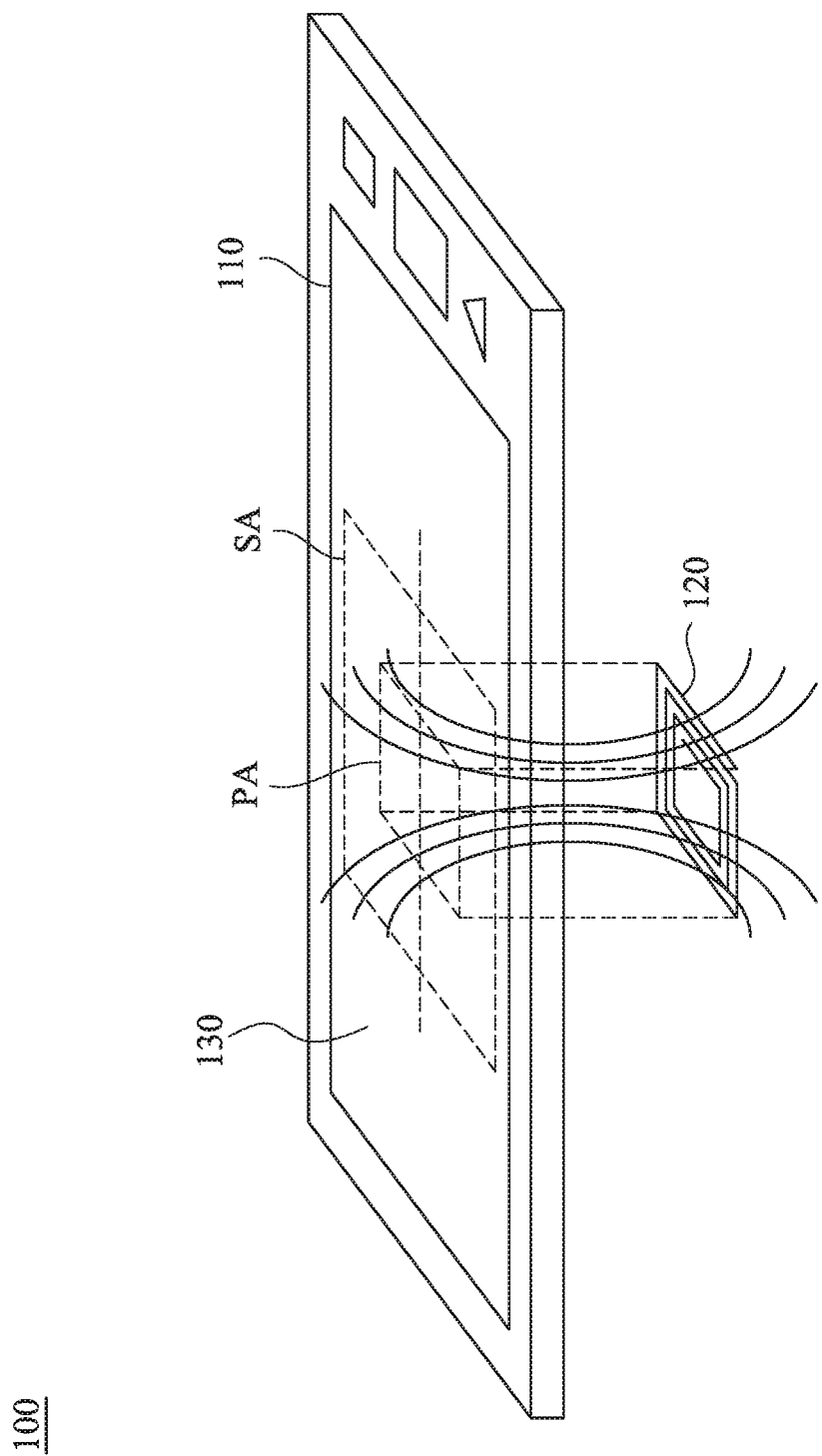
FIG. 1 is a simplified schematic diagram of an electronic device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a simplified schematic diagram of an electronic device 100 according to one embodiment of the present disclosure. The electronic device 100 comprises a display panel 110 and a first RF antenna 120, wherein a first projection area PA is corresponding to a vertical projection of the first RF antenna 120 on the display panel 110, and the display panel 110 comprises a first induction area SA. The first induction area SA is located on a surface 130 of the display panel 110, wherein the magnetic field generated by the first RF antenna 120 passes through the display panel 110 via the first induction area SA. The first induction area SA is larger than the first projection area PA (i.e., the first projection area PA is located in the first induction area SA). For the sake of brevity, other functional blocks of the electronic device 100 are not shown in FIG. 1.

In practice, the electronic device 100 may be realized with an electronic device comprising the display device and capable of communicating wirelessly, including the tablet computer, the smart phone, or the point-of-sale terminal, etc. The first RF antenna 120 may be realized with any type of antenna complying with the radio frequency identification (RFID) such as the near field communication (NFC) antenna.

In this embodiment, the boundary of the first induction area SA is identified according to the magnetic intensity of the magnetic field generated by the first RF antenna 120, wherein the aforesaid magnetic intensity is measured over the surface 130 of the display panel 110. In the situation that the magnetic field generated by the first RF antenna 120 has a first intensity and the first intensity is the maximum magnetic intensity measured over the surface 130 of the display panel 110, the first induction area SA is corresponding to an area, on the surface 130 of the display panel 110, having a magnetic intensity larger than two percent of the first intensity.

In other words, within the first induction area SA, the magnetic field generated by the first RF antenna 120 has a magnetic intensity larger than or equal to a predetermined value (e.g., two percent of the first intensity).

Figure 2:
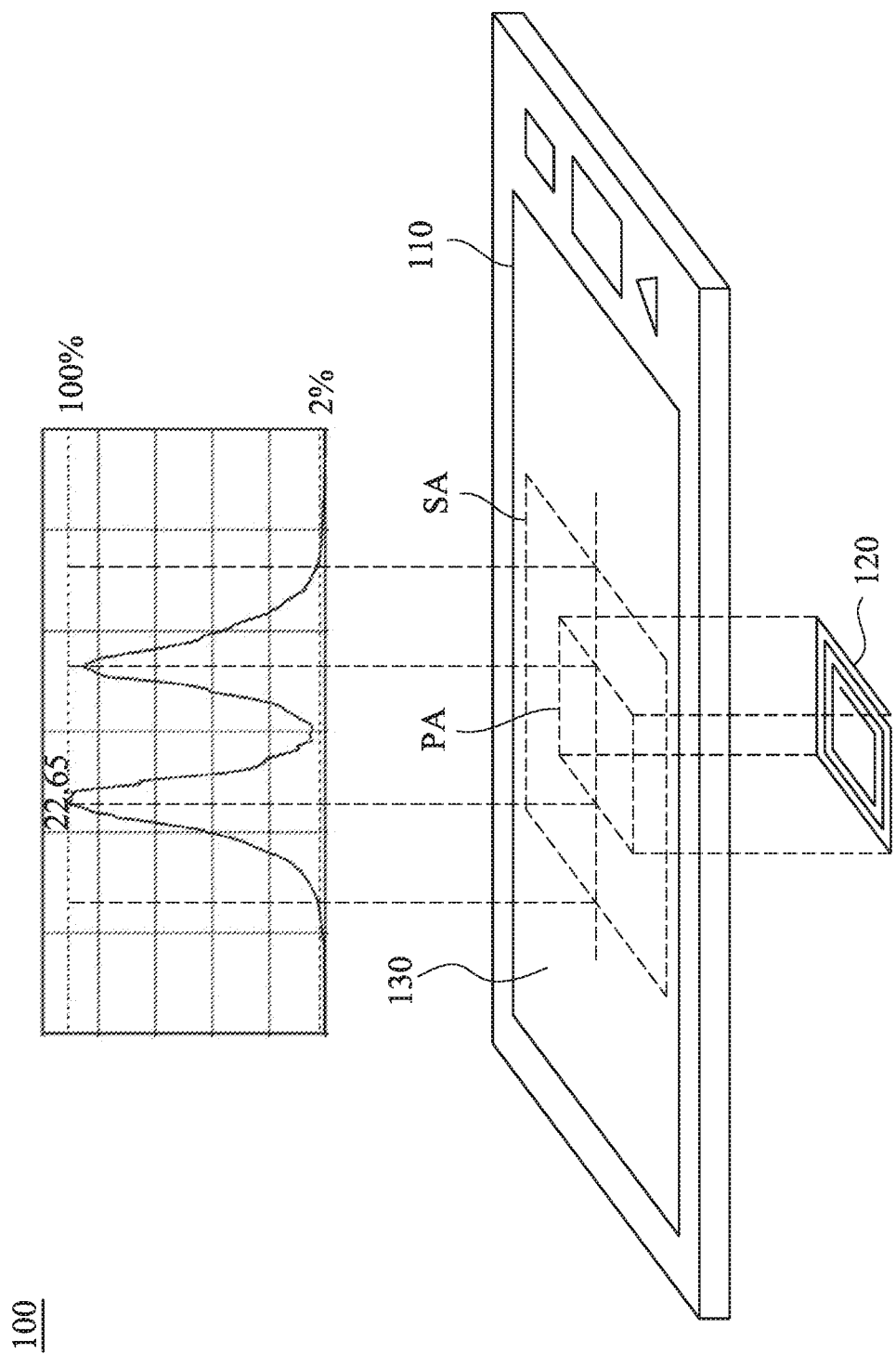
FIG. 2 is a simplified schematic diagram of magnetic field intensity measured over the surface of the display panel according to one embodiment of the present disclosure.

In the embodiment of FIG. 2, for example, the magnetic field generated by the first RF antenna 120 having a maximum magnetic intensity that is 22.65 A/m over the surface 130 of the display panel 110, wherein two percent of 22.65 A/m is 0.453 A/m. Therefore, the first induction area SA is corresponding to an area on the surface 130 having a magnetic intensity larger than or equal to 0.453 A/m.

In addition, in some embodiments, if the width of the first projection area PA is about 80 mm, the width of the first induction area SA is about 160 mm.

Figure 3:
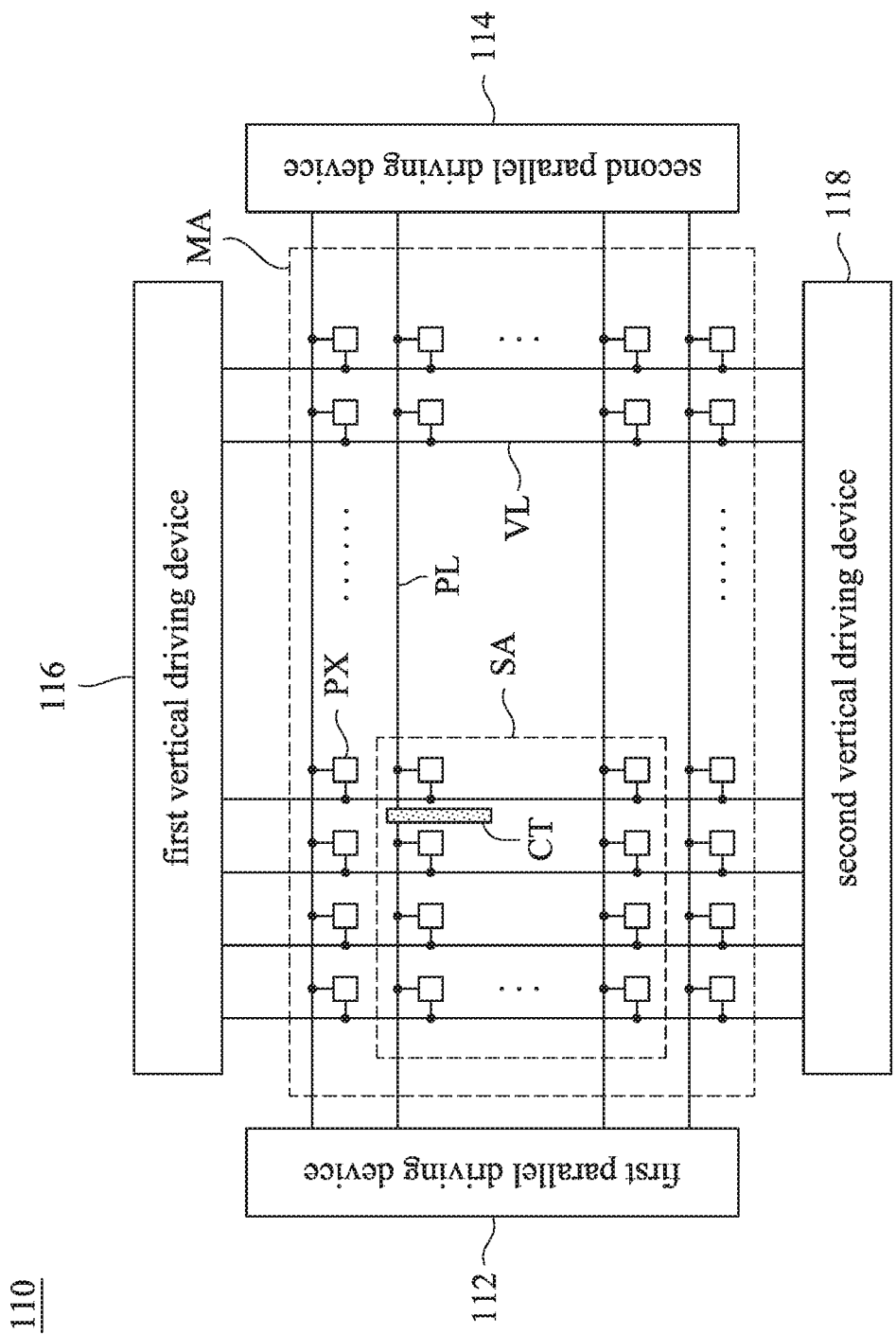
FIG. 3 is a simplified functional block diagram of the display panel of FIG. 1 according to one embodiment of the present disclosure.

FIG. 3 is a simplified functional block diagram of the display panel 110 of FIG. 1 according to one embodiment of the present disclosure. The display panel 110 comprises a first induction area SA, a pixel array MA, a first parallel driving device 112, a second parallel driving device 114, a first vertical driving device 116, and a second vertical driving device 118. For the sake of brevity, other functional blocks of the display panel 110 are not shown in FIG. 3.

The pixel array MA comprises a plurality of pixels PX, a plurality of vertical driving lines VL, and a plurality of parallel driving lines PL. The plurality of vertical driving lines VL and the plurality of parallel driving lines PL are configured to drive the plurality of pixels PX. The plurality of parallel driving lines PL are coupled with the first parallel driving device 112 and the second parallel driving device 114. The plurality of vertical driving lines VL are coupled with the first vertical driving device 116 and the second vertical driving device 118. In addition, the first induction area SA is overlapped with the pixel array MA, and thus the first induction area SA comprises part of the plurality of pixels PX.

In practice, if the first parallel driving device 112 and the second parallel driving device 114 are realized with the source drivers, the first vertical driving device 116 and the second vertical driving device 118 are realized with the gate drivers. If the first parallel driving device 112 and the second parallel driving device 114 is realized with the gate drivers, the first vertical driving device 116 and the second vertical driving device 118 is realized with the source drivers.

As shown in FIG. 3, the first induction area SA comprises at least one cutting area CT, and at least one parallel driving line PL and/or at least one vertical driving line VL overlapped with the first induction area SA is fragmented by the cutting area CT into multiple driving lines, wherein the multiple driving lines are electrically isolated from each other. Therefore, when the magnetic field of the first RF antenna 120 induces current in the first induction area SA, the induced current would only flow on a shorter loop path, and would not flow on a longer loop path already fragmented by the cutting area CT. As a result, the induced current would only cause a weaker induced magnetic field, and the work efficiency of the first RF antenna 120 may be increased.

The size and position of the first induction area SA of FIG. 3 are for illustrative purpose only, and are not intend to limit the implementation of the present disclosure. In some embodiments, the first induction area SA has a size not smaller than the size of the pixel array MA.

FIGS. 4A to 6C are simplified enlarged views of part of the display panel 110 according to various embodiments of the present disclosure. The implementations of the first induction area SA, parallel driving lines PL, vertical driving lines VL, and cutting area CT of the display panel 110 will be further described in the following by reference to FIGS. 4A-6C.

Figure 4A:
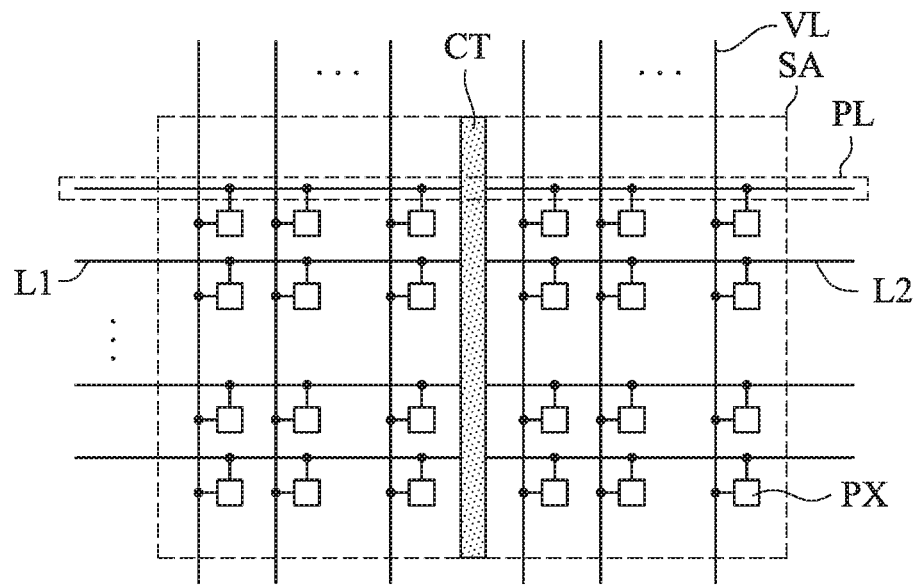
FIGS. 4A to 6C are simplified enlarged views of part of the display panel according to various embodiments of the present disclosure.

In the embodiment of FIG. 4A, the first induction area SA comprises a cutting area CT, and the cutting area CT fragments all of the parallel driving lines PL overlapped with the first induction area SA. That is, each of the parallel driving lines PL overlapped with the first induction area SA comprises a first driving line L1 and a second driving line L2, wherein the first driving line L1 and the second driving line L2 are electrically isolated from each other. The first driving line L1 and the second driving line L2 of the same parallel driving line PL may be enabled in synchronization with each other to cooperatively drive a row of pixels PX within the first induction area SA.

In detail, the first driving line L1 and the second driving line L2 of the same parallel driving line PL are coupled with the first parallel driving device 112 and the second parallel driving device 114, respectively. The first parallel driving device 112 is configured to enable the first driving line L1, and the second parallel driving device 114 is configured to enable the second driving line L2. The first parallel driving device 112 and the second parallel driving device 114 may enable the first driving line L1 and the second driving line L2 of the same parallel driving line PL in synchronization, so as to cooperatively drive a row of pixels PX within the first induction area SA.

Figure 4B:
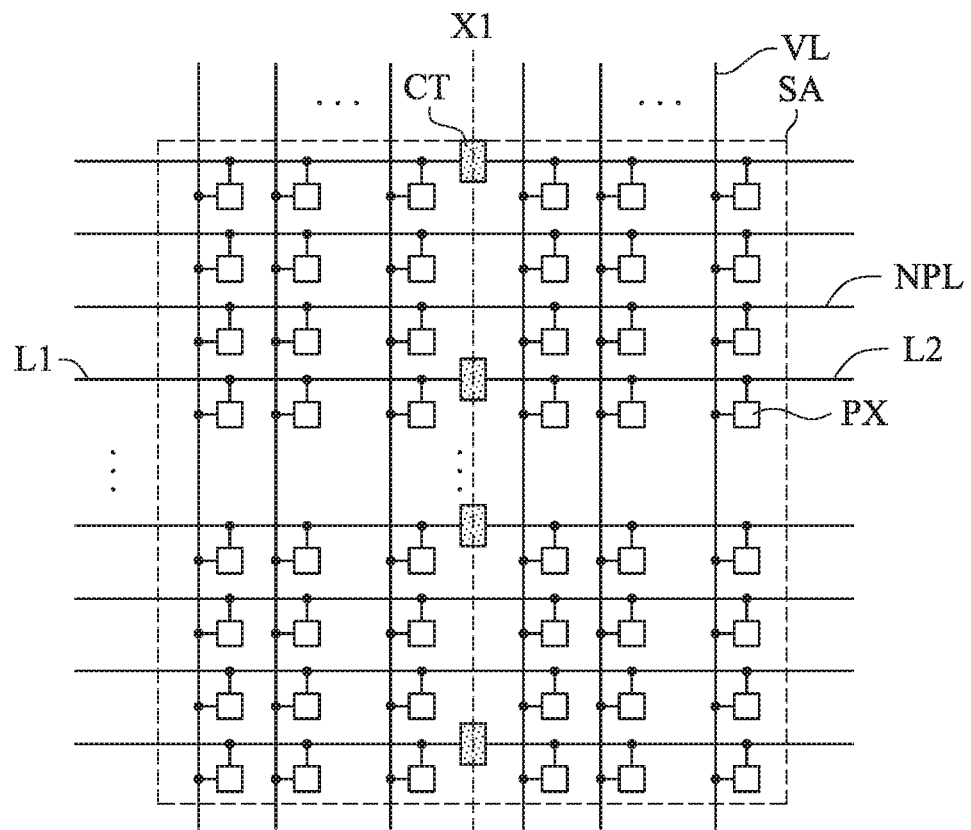

In the embodiment of FIG. 4B, the first induction area SA comprises a plurality of cutting areas CT. The plurality of cutting areas CT are arranged on the axis X1, two adjacent cutting areas CT are spaced with each other, and the axis X1 is parallel with the vertical driving lines VL. Each of the cutting areas CT fragments at least one of the parallel driving lines PL overlapped with the first induction area SA. That is, each of the part of the parallel driving lines PL overlapped with the first induction area SA comprises the first driving line L1 and the second driving line L2, and the first driving line L1 and the second driving line L2 are electrically isolated from each other. The first driving line L1 and second driving line L2 of the same parallel driving line PL may be enabled in synchronization with each other, so as to cooperatively drive a row of pixels PX within the first induction area SA.

On the other hand, in the embodiment of FIG. 4B, another part of the parallel driving lines PL overlapped with the first induction area SA are not fragmented by the cutting areas CT. For the sake of brevity, these parallel driving lines PL, which are overlapped with the first induction area SA and not being fragmented by the cutting areas CT, are hereinafter referred to as uncut parallel driving lines NPL. As shown in FIG. 4B, at least one uncut parallel driving line NPL is located between two adjacent cutting areas CT, wherein each uncut parallel driving line NPL is capable of driving a row of pixels PX within the first induction area SA independently.

Figure 5A:
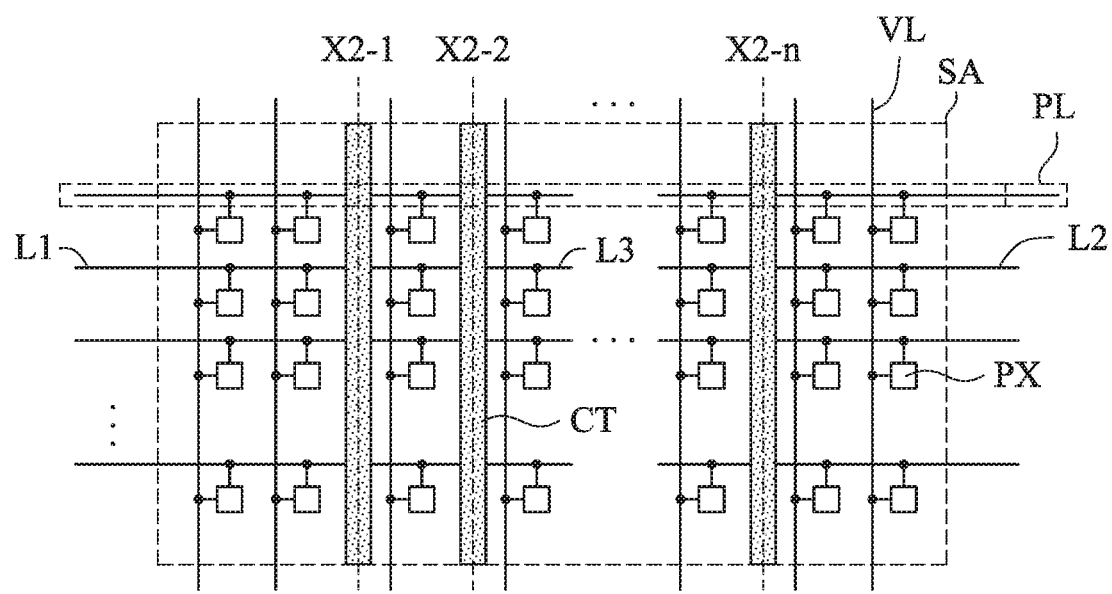

In the embodiment of FIG. 5A, the first induction area SA comprises a plurality of cutting areas CT. The plurality of cutting areas CT are arranged on the axes X2-1~X2-n, respectively, the axes X2-1~X2-n are parallel with each other, and n is an positive integer larger than or equal to 2. Each of the cutting areas CT fragments all of the parallel driving lines PL overlapped with the first induction area SA. As shown in FIG. 5A, Each of the parallel driving lines PL overlapped with the first induction area SA comprises the first driving line L1, the second driving line L2, and at least one third driving line L3, wherein the first driving line L1, the second driving line L2, and the at least one third driving line L3 are electrically isolated from each other.

One of the at least one of third driving line L3 is located between two adjacent cutting areas CT. For example, in the situation that the first induction area SA of FIG. 5A comprises two cutting areas CT (i.e., n is equal to 2), each of the parallel driving lines PL overlapped with the first induction area SA comprises one first driving line L1, one second driving line L2, and one third driving line L3 that are electrically isolated from each other.

As another example, in the situation that the first induction area SA comprises three cutting areas CT (i.e., n is equal to 3), each of the parallel driving lines PL overlapped with the first induction area SA comprises one first driving line L1, one second driving line L2, and two third driving lines L3 that are electrically isolated from each other, and so on.

In this embodiment, the first driving line L1, the second driving line L2, and the at least one third driving line L3 of the same parallel driving line PL may be enabled in synchronization with each other to cooperatively drive a row of pixels within the first induction area SA.

In practice, the third driving line L3 may be conducted by the wireless data transmission method. For example, the electronic device 100 may comprise a substrate (not shown in FIG. 3), and a wireless signal transmission unit is arranged on the substrate. The third driving line L3 may be coupled with a wireless signal receiving unit (not shown in FIGS. 4A to 4B), and the wireless signal receiving unit may receive data signals from the wireless signal transmission unit to enable the third driving line L3. As a result, although the third driving line L3 is electrically isolated from the first driving line L1 and the second driving line L2, the third driving line L3 still can be enabled in synchronization with the first driving line L1 and the second driving line L2.

Figure 5B:
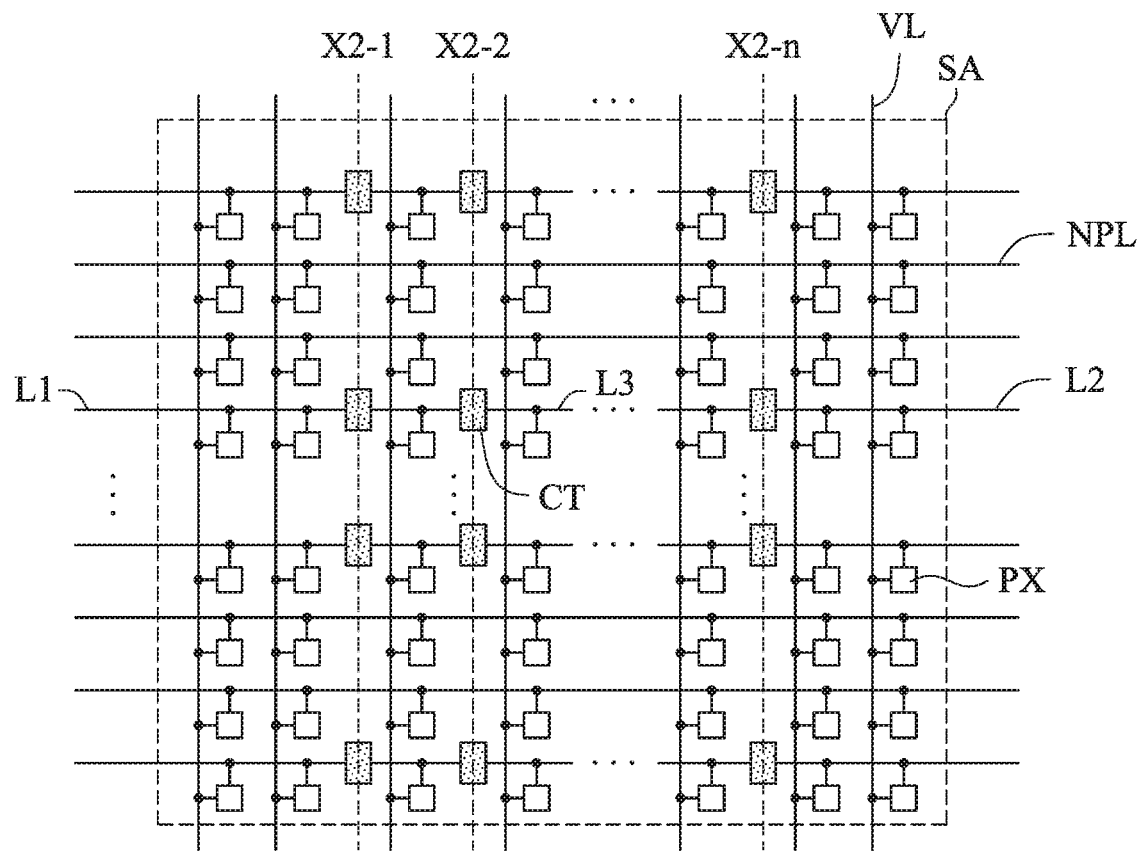

In the embodiment of FIG. 5B, the first induction area SA comprises a plurality of cutting areas CT. The plurality of cutting areas CT are arranged on the axes X2-1~X2-n, two adjacent cutting areas CT are spaced with each other, and n is a positive integer larger than or equal to 2. The axes X2-1~X2-n are parallel with each other, and also are parallel with the vertical driving lines VL. Therefore, among the parallel driving lines PL overlapped with the first induction area SA, part of the parallel driving lines PL are fragmented by the cutting areas CT, and each of the part of the parallel driving lines PL comprises the first driving line L1, the second driving line L2, and the at least one third driving line L3. The first driving line L1, the second driving line L2, and the at least one third driving line L3 are electrically isolated from each other.

On the other hand, the another part of the parallel driving lines PL are the uncut parallel driving lines NPL, wherein at least one uncut parallel driving line NPL is located between two adjacent cutting areas CT arranged on the same axis (e.g., the axis X2-1).

In this embodiment, in the situation that n is equal to 2, among the parallel driving lines PL overlapped with the first induction area SA of FIG. 5B, each of the parallel driving lines PL fragmented by the cutting areas CT comprises the first driving line L1, the second driving line L2, and one third driving line L3. The first driving line L1, the second driving line L2, and the third driving line L3 are electrically isolated from each other.

In addition, in the situation that n is equal to 3, among the parallel driving lines PL overlapped with the first induction area SA of FIG. 5B, each of the parallel driving lines PL fragmented by the cutting areas CT comprises the first driving line L1, second driving line L2, and two third driving lines L3, and so on. The first driving line L1, the second driving line L2, and the two third driving lines L3 are electrically isolated from each other.

Figure 6A:
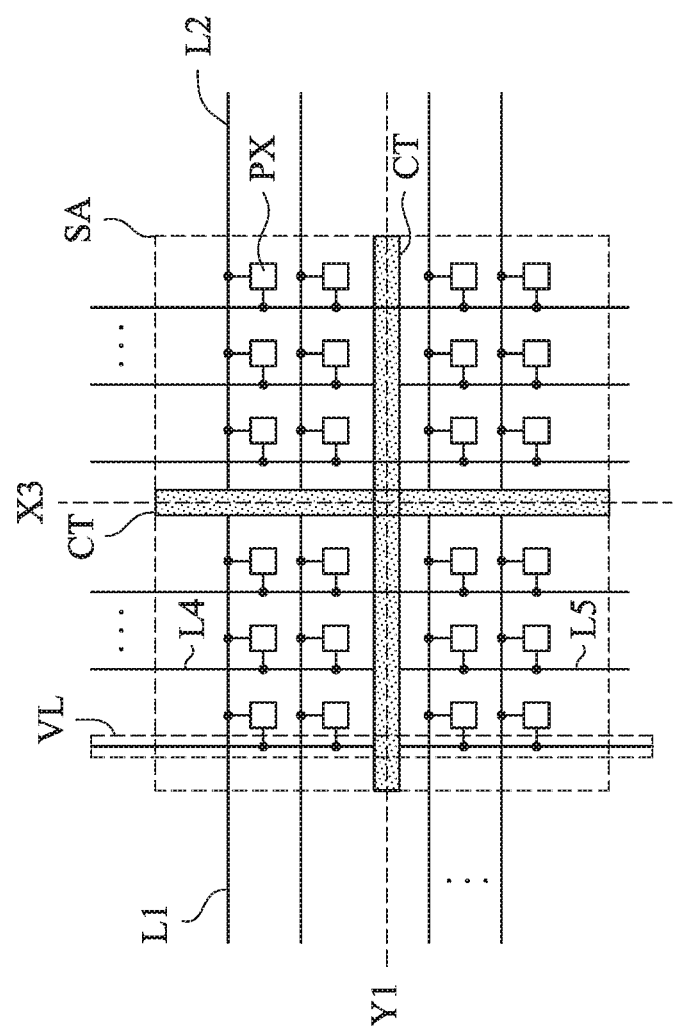

In the embodiment of FIG. 6A, the first induction area SA comprises two cutting areas CT. One of the two cutting areas CT is arranged on the axis X3 and fragments all of the parallel driving lines PL overlapped with the first induction area SA. Another cutting area CT is arranged on the axis Y1 and fragments all of the vertical driving lines PL overlapped with the first induction area SA. The axis X3 is parallel with the vertical driving lines VL, and the axis Y1 is parallel with the parallel driving lines PL. Thus, each of the parallel driving lines PL overlapped with the first induction area SA comprises the first driving line L1 and the second driving line L2, wherein the first driving line L1 and the second driving line L2 are electrically isolated from each other. Each of the vertical driving lines VL overlapped with the first induction area SA comprises a fourth driving line L4 and a fifth driving line L5, wherein the fourth driving line L4 and the fifth driving line L5 are electrically isolated from each other.

In this embodiment, the first driving line L1 and the second driving line L2 of the same parallel driving line PL may be enabled in synchronization with each other to cooperatively drive a row of pixels PX within the first induction area SA. The fourth driving line L4 and the fifth driving line L5 of the same vertical driving line VL may be enabled in synchronization with each other to cooperatively drive a column of pixels PX within the first induction area SA.

In some embodiment, for example, the fourth driving line L4 and the fifth driving line L5 of the same vertical driving line VL are coupled with the first vertical driving device 116 and the second vertical driving device 118, respectively. The first vertical driving device 116 is configured to enable the fourth driving line L4, and the second vertical driving device 118 is configured to drive the fifth driving line L5. The first vertical driving device 116 and the second vertical driving device 118 may enable the fourth driving line L4 and the fifth driving line L5 of the same vertical driving line VL in synchronization with each other to cooperatively drive a column of pixels PX within the first induction area SA.

In addition, the column of pixels PX driven by the fourth driving line L4 and the fifth driving line L5 are arranged perpendicularly to the row of pixels PX driven by the first driving line L1 and the second driving line L2.

Figure 6B:
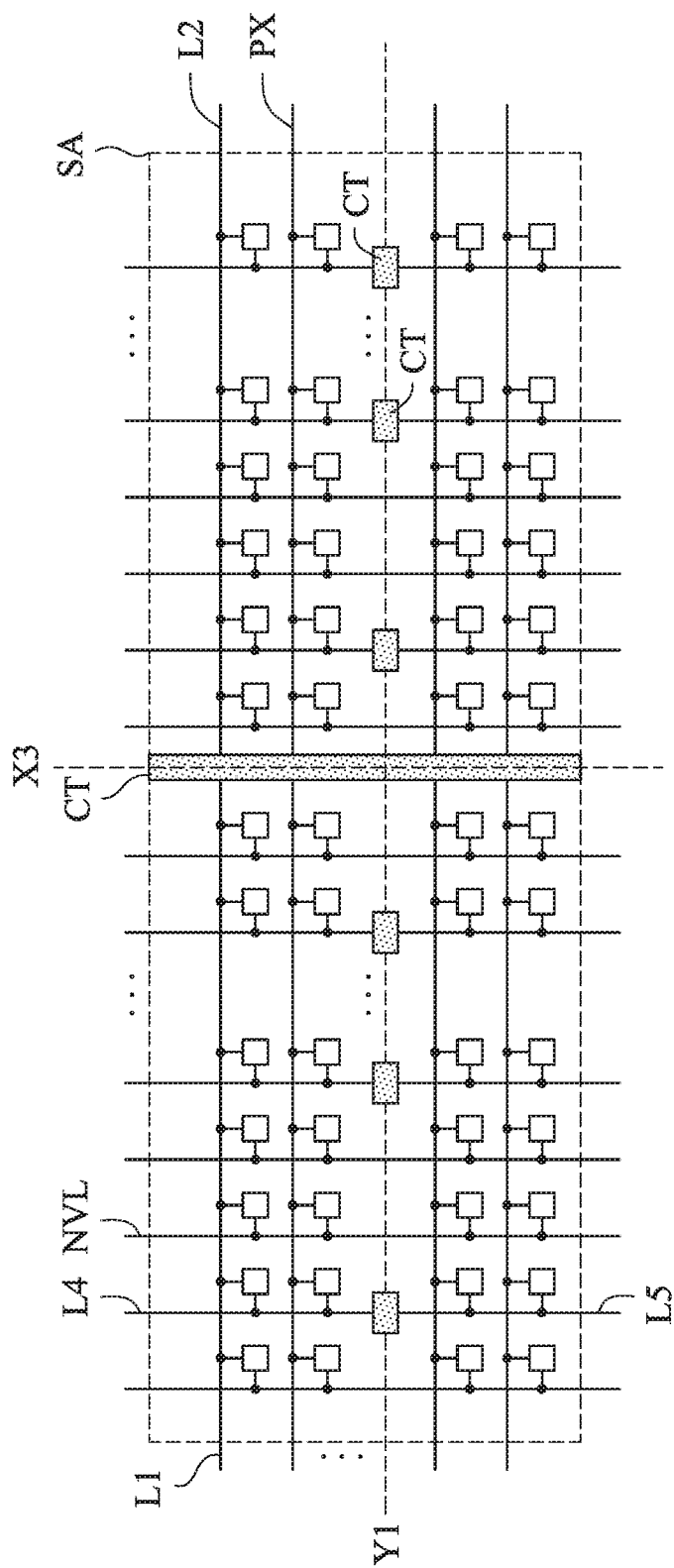

In the embodiment of FIG. 6B, the first induction area SA comprises a plurality of cutting areas CT. One of the cutting areas CT is arranged on the axis X3 and fragments all of the parallel driving lines PL overlapped with the first induction area SA. Therefore, each of the parallel driving lines PL overlapped with the first induction area SA comprises the first driving line L1 and the second driving line L2, wherein the first driving line L1 and the second driving line L2 are electrically isolated from each other.

In addition, other cutting areas CT are arranged on the axis Y1. Thus, among the vertical driving lines VL overlapped with the first induction area SA, part of the vertical driving lines VL each comprises the fourth driving line L4 and the fifth driving line L5, wherein the fourth driving line L4 and the fifth driving line L5 are electrically isolated from each other. Another part of the vertical driving lines VL are not fragmented by the cutting areas CT. For the sake of brevity, these vertical driving lines VL, which are overlapped with the first induction area SA and are not being fragmented by the cutting areas CT, are hereinafter referred to as uncut vertical driving lines NVL.

In this embodiment, at least one uncut vertical driving line NVL is located between two adjacent cutting areas CT arranged on the axis Y1. The first driving line L1 and the second driving line L2 of the same parallel driving line PL may be enabled in synchronization to drive a row of pixels PX within the first induction area SA. The fourth driving line L4 and the fifth driving line L5 of the same vertical driving line VL may be enabled in synchronization to drive a column of pixels PX within the first induction area SA. In addition, each uncut vertical driving line NVL is capable of independently driving a column of pixels PX within the first induction area SA.

Figure 6C:
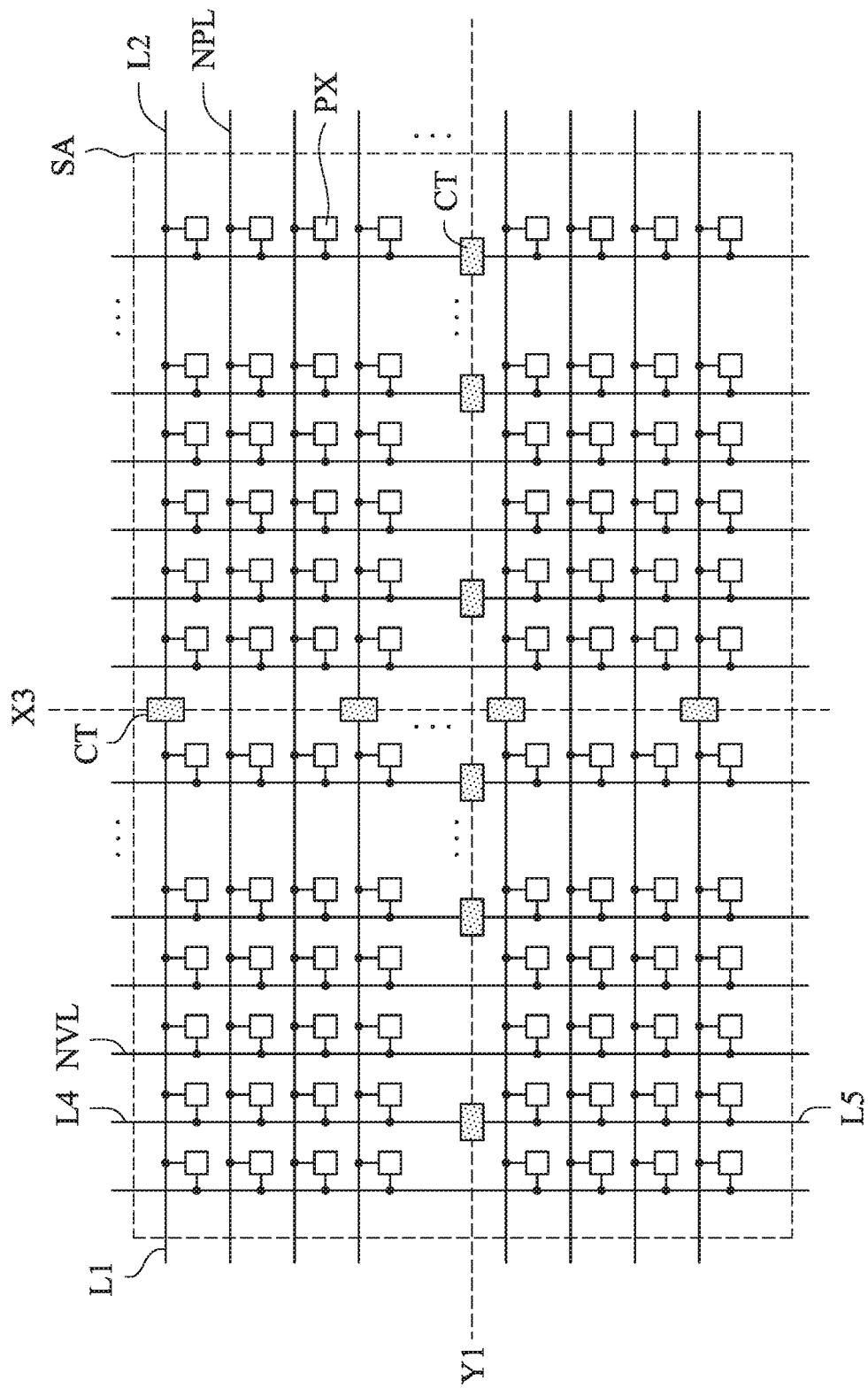

The embodiment of FIG. 6C is similar to the embodiment of FIG. 6B, the difference is that a plurality of cutting areas CT are arranged on the axis X3 of FIG. 6C, and not all of the parallel driving lines PL overlapped with the first induction area SA are fragmented by the cutting areas CT. Thus, among the parallel driving lines PL overlapped with the first induction area SA, part of the parallel driving lines PL each comprises the first driving line L1 and the second driving line L2, wherein the first driving line L1 and the second driving line L2 are electrically isolated from each other. In addition, another part of the parallel driving lines PL overlapped with the first induction area SA are uncut parallel driving lines NPL.

The foregoing descriptions regarding the implementations, connections, operations, and related advantages of other corresponding functional blocks in the embodiment of FIG. 6B are also applicable to the embodiment of FIG. 6C. For the sake of brevity, those descriptions will not be repeated here.

As can be appreciated from the foregoing descriptions, the driving lines of the display panel 110 are fragmented into multiple sections to reduce the length of the current path of the loop induced current induced by an external magnetic field. Therefore, the intensity of the induced magnetic field caused by the induced current may be decreased. As a result, within the electronic device 100, although the display panel 110 is overlapped with the first RF antenna 120, the first RF antenna 120 may still have good work efficiency.

Table 1 shows the induced voltages measured at points A to E in the situation that the first induction area SA comprises no cutting area CT. The points A to E are on a surface 4 cm above the surface 130 of the display panel 110. A test antenna (not shown in the figures) and the first RF antenna 120 are arranged at two opposite sides of the display panel 110, wherein the test antenna is configured to measure the induced voltages. In addition, a connection line between the points B and D and another connection line between the points C and E are arranged as an orthogonal cross-shaped, while the two connection lines intersect at point A. The points B to E are located at a circumference of a circle centered on the point A, wherein the circle has a 1.5 mm radius.

TABLE 1

|  | A | B | C | D | E |
|---|---|---|---|---|---|
| voltage (V) | 1.15 | 0.96 | 0.85 | 0.98 | 0.90 |

Table 2 shows the induced voltages measured at points A to E in the situation that the first induction area SA comprises one cutting area CT fragmenting all of the parallel driving lines PL overlapped with the first induction area SA.

TABLE 2

|  | A | B | C | D | E |
|---|---|---|---|---|---|
| voltage (V) | 2.1 | 1.9 | 1.8 | 1.78 | 1.9 |

As can be appreciated from Table 2, when the parallel driving lines PL overlapped with the first induction area SA are fragmented into multiple driving lines that are electrically isolated from each other, the induced voltages measured by the test antenna are significantly larger compared to the situation that the first induction area SA comprises no cutting area CT (i.e., the situation of Table 1). That is, when the parallel driving lines PL overlapped with the first induction area SA are fragmented by the cutting area CT, the work efficiency of the first RF antenna 120 is significantly increased.

Table 3 shows the induced voltages measured at points A to E in the situation that the first induction area SA comprises a cutting area CT fragmenting all of the vertical driving lines VL overlapped with the first induction area SA.

TABLE 3

|            | A    | B    | C    | D    | E    |
|------------|------|------|------|------|------|
| voltage (V)| 1.36 | 1.07 | 1.03 | 1.08 | 1.08 |

As can be appreciated from Table 3, when the vertical driving lines VL within the first induction area SA are fragmented into multiple driving lines that are electrically isolated from each other, the work efficiency of the first RF antenna 120 is significantly increased compared to that of the situation of Table 1.

Table 4 shows the induced voltages measured at points A to E in the situation that the first induction area SA comprises a cutting area CT fragmenting all of the parallel driving lines PL overlapped with the first induction area SA, and also comprises another cutting area CT fragmenting all of the vertical driving lines VL overlapped with the first induction area SA.

TABLE 4

|            | A    | B    | C    | D    | E    |
|------------|------|------|------|------|------|
| voltage (V)| 2.62 | 2.37 | 2.30 | 2.43 | 2.35 |

As can be appreciated from Table 4, when the parallel driving lines PL and vertical driving lines VL overlapped with the first induction area SA are fragmented into multiple driving lines that are electrically isolated from each other, the work efficiency of the first RF antenna 120 is further increased compared to that of the situations of Tables 1~3.

Figure 7:
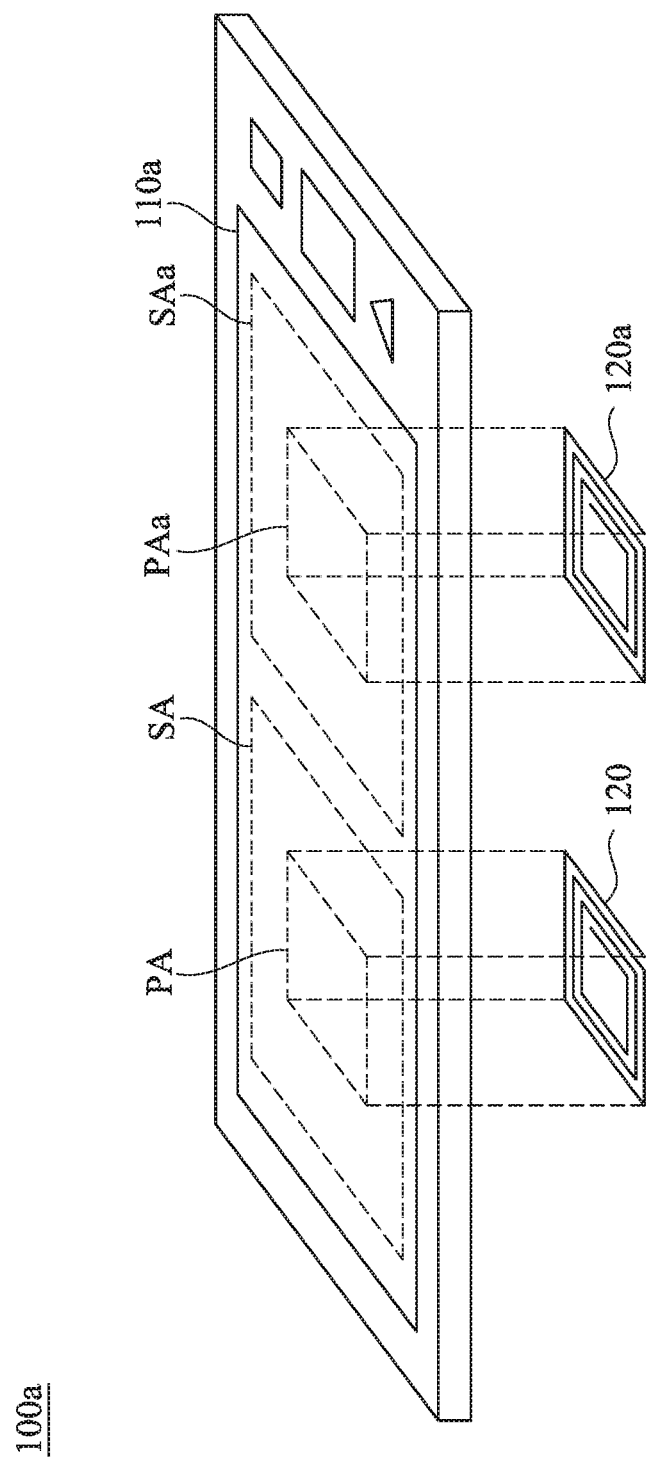
FIG. 7 is a simplified schematic diagram of an electronic device according to another embodiment of the present disclosure.

FIG. 7 is a simplified schematic diagram of an electronic device 100a according to one embodiment of the present disclosure. The electronic device 100a comprises a display panel 110a, a first RF antenna 120, and a second RF antenna 120a. The first projection area PA is corresponding to a vertical projection of the first RF antenna 120 on the display panel 110a, while a second projection area PAa is corresponding to a vertical projection of the second RF antenna 120a on the display panel 110a. The display panel 110a is similar to the display panel 110, and the difference is that the display panel 110a further comprises a second induction area SAa. The magnetic field generated by the second RF antenna 120a passes through the display panel 110a via the second induction area SAa, and the second induction area SAa is larger than the second projection area PAa. For the sake of brevity, other functional blocks of the electronic device 100a are not shown in FIG. 7.

In this embodiment, the second induction area SAa comprises at least one cutting area CT. The boundary of the second induction area SAa is defined by a method similar to that of the first induction area SA of the embodiment of FIGS. 3 to 6C. The at least one cutting area CT within the second induction area SAa is arranged in a manner similar to that of the first induction area SA of the embodiment of FIGS. 3 to 6C. That is, at least one parallel driving line PL and/or at least one vertical driving line VL overlapped with the second induction area SAa is fragmented by the cutting area CT into multiple driving lines that are electrically isolated from each other.

The foregoing descriptions regarding the implementations, connections, operations, and related advantages of other corresponding functional blocks in the electronic device 100 are also applicable to the electronic device 100a. For the sake of brevity, those descriptions will not be repeated here.

Figure 8:
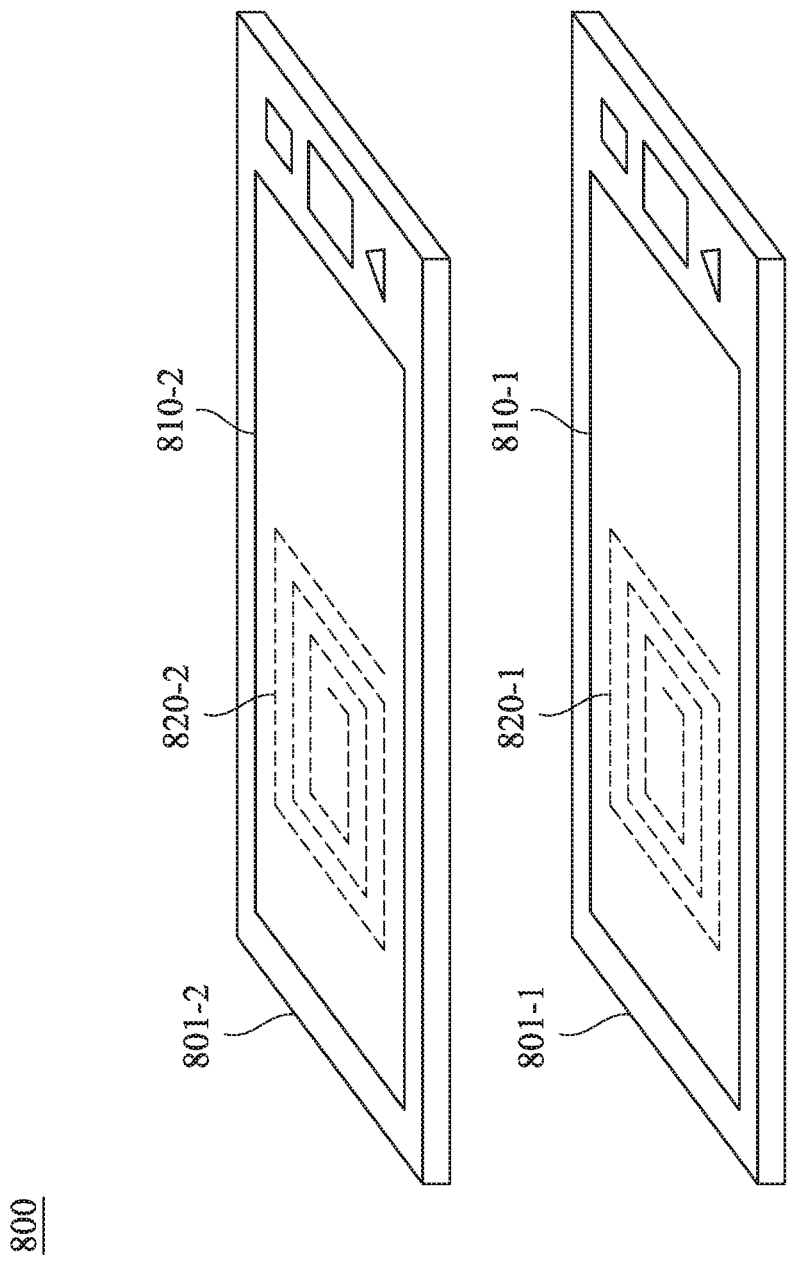
FIG. 8 is a simplified schematic diagram of a data transmission system according to one embodiment of the present disclosure.

FIG. 8 is a simplified schematic diagram of a data transmission system 800 according to one embodiment of the present disclosure. The data transmission system 800 comprises a first electronic device 801-1 and a second electronic device 801-2. The first electronic device 801-1 comprises a first display panel 810-1 and a first RF antenna 820-1, and the second electronic device 801-2 comprises a second display panel 810-2 and second RF antenna 820-2. When the first electronic device 801-1 is approached to the second electronic device 801-2, the first electronic device 801-1 and the second electronic device 801-2 may exchange data through the first RF antenna 820-1 and the second RF antenna 820-2. For the sake of brevity, other functional blocks of the data transmission system 800 are not shown in FIG. 8.

The foregoing descriptions regarding the implementations, connections, operations, and related advantages of other corresponding functional blocks in the electronic device 100 are also applicable to the first electronic device 801-1 and the second electronic device 801-2. For the sake of brevity, those descriptions will not be repeated here.

In some embodiment, each of the first electronic device 801-1 and the second electronic device 801-2 may be realized with the smartphone or the tablet computer. When the first electronic device 801-1 and the second electronic device 801-2 are approached to each other, the first electronic device 801-1 and the second electronic device 801-2 may use any suitable wireless protocol (e.g., the NFC protocol) to exchange the multimedia files, including the image file and the audio file.

In other embodiments, one of the first electronic device 801-1 and the second electronic device 801-2 is realized with the smartphone or the tablet computer, and another one is realized with the point-of-sale terminal. When the first electronic device 801-1 and the second electronic device 801-2 are approached to each other, the first electronic device 801-1 and the second electronic device 801-2 may use any suitable wireless protocols (e.g., the NFC protocol) to conduct financial transactions, including tap-and-pay payment or depositing or deducting card points.

Figure 9:
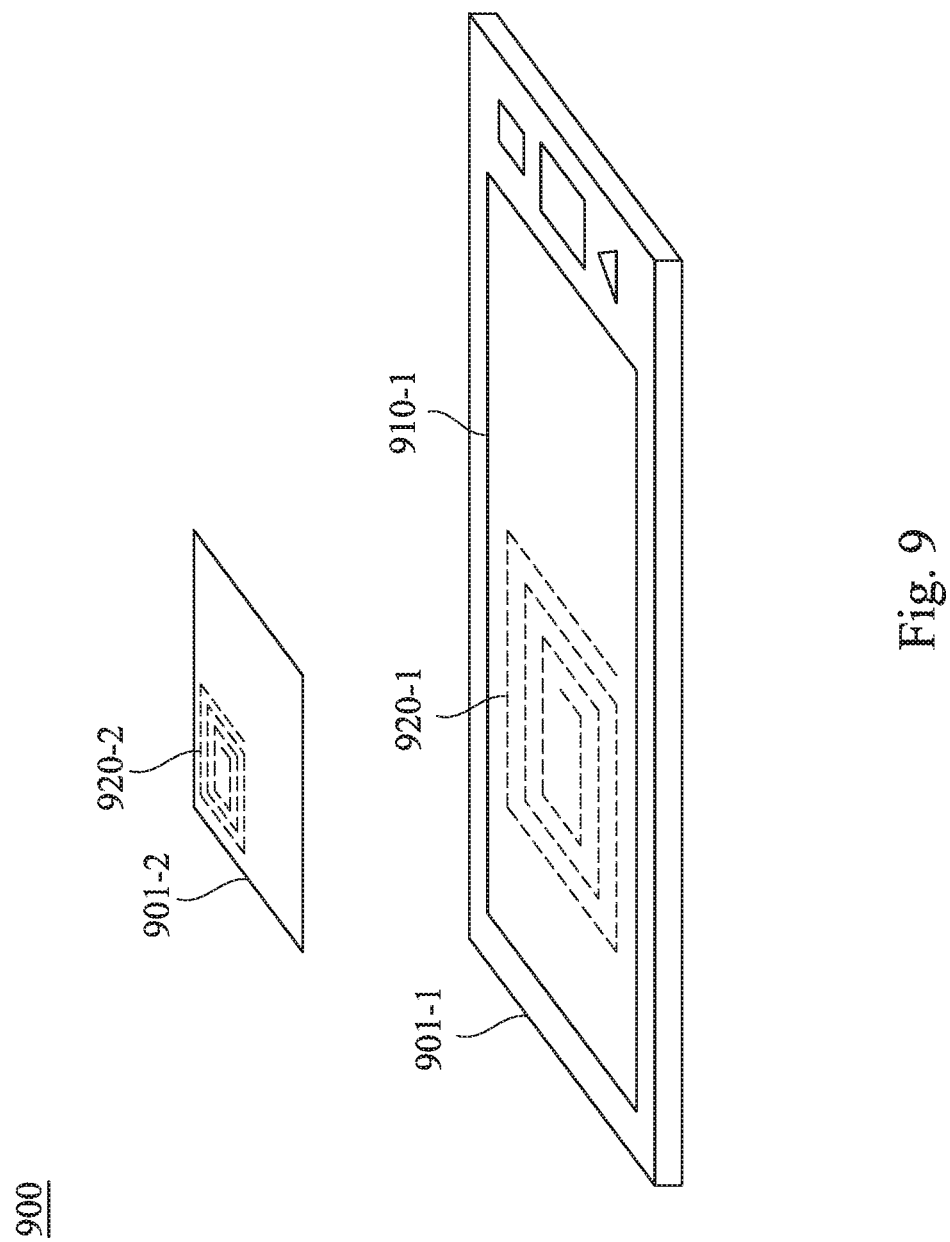
FIG. 9 is a simplified schematic diagram of a data transmission system according to another embodiment of the present disclosure.

FIG. 9 is a simplified schematic diagram of a data transmission system 900 according to one embodiment of the present disclosure. The data transmission system 900 comprises a first electronic device 901-1 and a second electronic device 901-2. The first electronic device 901-1 comprises a first display panel 910-1 and a first RF antenna 920-1, and the second electronic device 901-2 comprises a second RF antenna 920-2. When the first electronic device 901-1 is approached to the second electronic device 901-2, the first electronic device 901-1 and the second electronic device 901-2 may exchange data through the first RF antenna 920-1 and the second RF antenna 920-2. For the sake of brevity, other functional blocks of the data transmission system 900 are not shown in FIG. 9.

It is worth mentioning that the second electronic device 901-2 comprises no display panel.

The foregoing descriptions regarding the implementations, connections, operations, and related advantages of other corresponding functional blocks in the electronic device 100 are also applicable to the first electronic device 901-1. For the sake of brevity, those descriptions will not be repeated here.

In some embodiments, the first electronic device 901-1 may be realized with the smartphone, the table computer, or the point-of-sale terminal. The second electronic device 901-2 may be realized with any type of suitable integrated circuit card. When the second electronic device 901-2 is approached to the first display panel 910-1 of the first electronic device 901-1, the first electronic device 901-1 may use any suitable wireless protocols to read and/or write the storage module (not shown in FIG. 9) of the second electronic device 901-2.

In other embodiments, the first electronic device 901-1 may be realized with the automatic teller machine (ATM), and the second electronic device 901-2 may be realized with the chip ATM card or the chip credit card. When the second electronic device 901-2 is approached to the first display panel 910-1 of the first electronic device 901-1, the first electronic device 901-1 and the second electronic device 901-2 may use any suitable wireless protocols (e.g., the NFC protocol) to conduct the financial transactions, including withdrawal, deposit, or cash advance.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An electronic device, comprising:
   a display panel, comprising:
      a pixel array, comprising a plurality of pixels;
      a first induction area, located on a surface of the display panel;
      a plurality of vertical driving lines; and
      a plurality of parallel driving lines; and
   a first RF antenna, wherein a first projection area is corresponding to a vertical projection of the first RF antenna on the display panel, magnetic field generated by the first RF antenna passes through the display panel via the first induction area, and the first induction area is larger than the first projection area;
   wherein one of the plurality of parallel driving lines, overlapping with the first induction area, comprises a first driving line and a second driving line electrically isolated from each other and configured to drive a first row of pixels of the pixel array, and the first driving line and the second driving line are formed by dividing the one of the plurality of parallel driving lines by a first cutting area,
   wherein one of the plurality of vertical driving lines, overlapping with the first induction area, comprises a fourth driving line and a fifth driving line electrically isolated from each other and configured to drive a first column of pixels of the pixel array, and the fourth driving line and the fifth driving line are formed by dividing the one of the plurality of vertical driving lines by a second cutting area.

2. The electronic device of claim 1, wherein the magnetic field generated by the first RF antenna has a first magnetic intensity and a second magnetic intensity, the first magnetic intensity is a maximum magnetic intensity measured over the surface of the display panel, and the second magnetic intensity is a magnetic intensity measured at an arbitrary point over the first induction area,
   wherein the second magnetic intensity is larger than or equal to two percent of the first magnetic intensity.

3. The electronic device of claim 1, wherein the magnetic field generated by the first RF antenna has a magnetic intensity larger than or equal to a predetermined value, and the magnetic intensity is measured over the first induction area.

4. The electronic device of claim 1, wherein the one of the plurality of parallel driving lines comprises the first driving line, the second driving line, and a third driving line, wherein the first driving line, the second driving line, and the third driving line are electrically isolated from each other, the third driving line is located between the first driving line and the second driving line, and the first driving line, the second driving line, and the third driving line are configured to be enabled in synchronization with each other.

5. The electronic device of claim 4, further comprising:
   a wireless signal transmission unit, arranged on a substrate, configured to generate a data signal; and
   a wireless signal receiving unit, coupled with the third driving line;
   wherein the wireless signal receiving unit receives the data signal from the wireless signal transmission unit to enable the third driving line.

6. The electronic device of claim 1, wherein the one of the plurality of parallel driving lines comprises the first driving line, the second driving line, and a plurality of third driving lines, the plurality of third driving lines are located between the first driving line and the second driving line, and the first driving line, the second driving line, and the plurality of third driving lines are configured to be enabled in synchronization with each other.

7. The electronic device of claim 1, further comprising:
   a first parallel driving device, coupled with the first driving line; and
   a second parallel driving device, coupled with the second driving line;
   wherein the first parallel driving device and the second parallel driving device are configured to enable the first driving line and the second driving line in synchronization with each other.

8. The electronic device of claim 1, further comprising:
   a first vertical driving device, coupled with the fourth driving line; and
   a second vertical driving device, coupled with the fifth driving line;

wherein the first vertical driving device and the second vertical driving device are configured to enable the fourth driving line and the fifth driving line in synchronization with each other.

9. The electronic device of claim 1, wherein part of the plurality of vertical driving lines overlap with the first induction area, and each of the part of the plurality of vertical driving lines comprises the fourth driving line and the fifth driving line, and the fourth driving line and the fifth driving line are configured to be enabled in synchronization with each other.

10. The electronic device of claim 1, wherein part of the plurality of parallel driving lines overlap with the first induction area, and each of the part of the plurality of parallel driving lines comprises the first driving line and the second driving line, and the first driving line and the second driving line are configured to be enabled in synchronization with each other.

11. The electronic device of claim 1, further comprising:
a second RF antenna, wherein a second projection area is corresponding to a vertical projection of the second RF antenna on the display panel;
wherein the display panel further comprises a second induction area, the second induction area is located on the surface of the display panel, the magnetic field generated by the second RF antenna passes through the display panel via the second induction area, and the second induction area is larger than the second projection area;
wherein another one of the plurality of parallel driving lines overlaps with the second induction area, and the another one of the plurality of parallel driving lines comprises a sixth driving line and a seventh driving line, the sixth driving line and the seventh driving line are electrically isolated from each other, and the sixth driving line and the seventh driving line are configured to be enabled in synchronization with each other.

12. A display panel, comprising:
a pixel array, comprising a plurality of pixels;
a plurality of parallel driving lines, wherein one of the plurality of parallel driving lines comprises a first driving line and a second driving line electrically isolated from each other and formed by dividing the one of the plurality of parallel driving lines by a first cutting area;
a plurality of vertical driving lines, wherein one of the plurality of vertical driving lines comprises a fourth driving line and a fifth driving line electrically isolated from each other and formed by dividing the one of the plurality of vertical driving lines by a second cutting area; and
a first induction area, comprising part of the plurality of pixels, wherein magnetic field generated by a first RF antenna passes through the display panel via the first induction area, a first projection area is corresponding to a vertical projection of the first RF antenna on the display panel, and the first induction area is larger than the first projection area;
wherein the first driving line and the second driving line are configured to drive a first row of pixels among the part of the plurality of pixels, and the fourth driving line and the fifth driving line are configured to drive a first column of pixels among the part of the plurality of pixels.

13. The display panel of claim 12, wherein the magnetic field generated by the first RF antenna has a first magnetic intensity and a second magnetic intensity, the first magnetic intensity is a maximum magnetic intensity measured over a surface of the display panel, and the second magnetic intensity is a magnetic intensity measured at an arbitrary point over the first induction area,
wherein the second magnetic intensity is larger than or equal to two percent of the first magnetic intensity.

14. The display panel of claim 12, wherein the plurality of parallel driving lines comprise an uncut parallel driving line, and the uncut parallel driving line is configured to drive a second row of pixels among the part of the plurality of pixels within the first induction area.

15. The display panel of claim 12, wherein the one of the plurality of parallel driving lines further comprising:
a third driving line;
wherein the first driving line, the second driving line, and the third driving line are configured to drive the first row of pixels among the part of the plurality of pixels, the third driving line is located between the first driving line and the second driving line, and the first driving line, the second driving line, and the third driving line are electrically isolated from each other within the first induction area.

16. The display panel of claim 12, wherein the one of the plurality of parallel driving lines further comprising:
a plurality of third driving line;
wherein the first driving line, the second driving line, and the plurality of third driving lines are configured to drive the first row of pixels among the part of the plurality of pixels, the plurality of third driving lines are located between the first driving line and the second driving line, and the first driving line, the second driving line, and the plurality of third driving lines are electrically isolated from each other within the first induction area.

17. The display panel of claim 1, wherein the plurality of vertical driving lines comprise an uncut vertical driving line, the uncut vertical driving line is configured to drive a second column of pixels among the part of the plurality of pixels within the first induction area.

18. The display panel of claim 12, further comprising:
a second induction area, comprising another part of the plurality of pixels, wherein magnetic field generated by a second RF antenna passes through the display panel via the second induction area, a second projection area is corresponding to a vertical projection of the second RF antenna on the display panel, and the second induction area is larger than the second projection area;
wherein another one of the plurality of parallel driving lines comprises a sixth driving line and a seventh driving line;
wherein the sixth driving line and the seventh driving line are configured to drive a third row of pixels among the another part of the plurality of pixels, and the sixth driving line and the seventh driving line are electrically isolated from each other within the second induction area.

19. A data transmission system, comprising:
a first electronic device, comprising a first display panel and a first RF antenna; and
a second electronic device, comprising a second RF antenna, wherein when the first electronic device is approached to the second electronic device, the first electronic device transmits data to the second electronic device through the first RF antenna;

wherein the first display panel comprising:
- a first pixel array, comprising a plurality of first pixels;
- a plurality of parallel driving lines, wherein one of the plurality of parallel driving lines comprises a first driving line and a second driving line electrically isolated from each other and formed by dividing the one of the plurality of parallel driving lines by a first cutting area;
- a plurality of first vertical driving lines, wherein one of the plurality of vertical driving lines comprises a fourth driving line and a fifth driving line electrically isolated from each other and formed by dividing the one of the plurality of vertical driving lines by a second cutting area; and
- a first induction area, comprising part of the plurality of first pixels, wherein magnetic field generated by the first RF antenna passes through the first display panel via the first induction area, a first projection area is corresponding to a vertical projection of the first RF antenna on the first display panel, and the first induction area is larger than the first projection area;

wherein the first driving line and the second driving line are configured to drive a first row of pixels among the part of the plurality of first pixels, and the fourth driving line and the fifth driving line are configured to drive a first column of pixels among the part of the plurality of first pixels.

20. The data transmission system of claim 19, wherein the plurality of first parallel driving lines comprises an uncut parallel driving line, the uncut parallel driving line is configured to drive a second row of pixels among the part of the plurality of first pixels within the first induction area.

21. The data transmission system of claim 19, wherein the one of the plurality of first parallel driving lines further comprises:
- a third driving line;
- wherein the first driving line, the second driving line, and the third driving line are configured to drive the first row of pixels within the first induction area, and the first driving line, the second driving line, and the third driving line are electrically isolated from each other within the first induction area.

22. The data transmission system of claim 19, wherein the one of the plurality of first parallel driving lines further comprises:
- a plurality of third driving lines;
- wherein the first driving line, the second driving line, and the plurality of third driving lines are configured to drive the first row of pixels within the first induction area, and the first driving line, the second driving line, and the plurality of third driving lines are electrically isolated from each other within the first induction area.

23. The data transmission system of claim 19, wherein the plurality of first vertical driving lines comprise an uncut vertical driving line, the uncut vertical driving line is configured to drive a second column of pixels among the part of the plurality of first pixels within the first induction area.

24. The data transmission system of claim 19, wherein the second electronic device further comprises a second display panel, and the second display panel comprises:
- a second pixel array, comprising a plurality of second pixels;
- a plurality of second vertical driving lines;
- a plurality of second parallel driving lines, wherein one of the plurality of second parallel driving lines comprise a sixth driving line and a seventh driving line; and
- a second induction area, comprising part of the plurality of second pixels, wherein magnetic field generated by the second RF antenna passes through the second display panel via the second induction area, a second projection area is corresponding to a vertical projection of the second RF antenna on the second display panel, and the second induction area is larger than the second projection area;

wherein the sixth driving line and the seventh driving line are configured to drive a third row of pixels among the part of the plurality of second pixels, and the sixth driving line and the seventh driving line are electrically isolated from each other within the second induction area.

* * * * *